United States Patent
Xie

(10) Patent No.: US 10,191,325 B2
(45) Date of Patent: Jan. 29, 2019

(54) LIQUID CRYSTAL DISPLAY DEVICE AND LIQUID CRYSTAL DISPLAY PANEL THEREOF

(71) Applicant: Shenzhen China Star Optoelectronics Technology Co., Ltd., Shenzhen, Guangdong (CN)

(72) Inventor: Chang Xie, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 125 days.

(21) Appl. No.: 14/426,156

(22) PCT Filed: Nov. 17, 2014

(86) PCT No.: PCT/CN2014/091257
§ 371 (c)(1),
(2) Date: Mar. 4, 2015

(87) PCT Pub. No.: WO2016/074253
PCT Pub. Date: May 19, 2016

(65) Prior Publication Data
US 2016/0334670 A1    Nov. 17, 2016

(30) Foreign Application Priority Data
Nov. 11, 2014   (CN) .......................... 2014 1 0633031

(51) Int. Cl.
G02F 1/1335    (2006.01)
G02F 1/1368    (2006.01)
G02F 1/1337    (2006.01)

(52) U.S. Cl.
CPC ...... *G02F 1/133555* (2013.01); *G02F 1/1368* (2013.01); *G02F 1/133514* (2013.01);
(Continued)

(58) Field of Classification Search
CPC ........ G02F 2001/133557; G02F 2001/134381; G02F 2001/1343; G02F 2201/121;
(Continued)

(56) References Cited

U.S. PATENT DOCUMENTS 7,903,216 B2 * 3/2011 Tsuchiya ........... G02F 1/133707
349/114
8,867,000 B2 * 10/2014 Hagiwara ......... G02F 1/133555
349/106
(Continued)

*Primary Examiner* — Angela K Davison
(74) *Attorney, Agent, or Firm* — Andrew C. Cheng

(57) ABSTRACT

The present invention provides a liquid crystal display device and a liquid crystal display panel thereof. Each pixel unit comprises staggered reflecting regions and transmitting regions. The reflecting region is corresponded with a reflective layer and a common electrode. The transmitting region is corresponded with a pixel electrode and a common electrode. By applying voltages to the pixel electrode and the common electrode, the transflective display of the liquid crystal display panel can be achieved. With the aforesaid arrangement, the electrode structure employed by the present invention is capable of reducing the drive voltage, raising the luminous transmittance and enlarging the view angle. With the vertical orientation, the dark-state light leakage can be diminished to promote the display contrast. The difficulty of the manufacture process can be reduced with the single cell thickness structure.

20 Claims, 2 Drawing Sheets

(52) U.S. Cl.
CPC ............ *G02F 2001/133742* (2013.01); *G02F 2201/121* (2013.01); *G02F 2201/123* (2013.01); *G02F 2203/09* (2013.01); *G09G 2300/0456* (2013.01)

(58) Field of Classification Search
CPC ......... G02F 2201/123; G02F 1/133555; G02F 1/133514; G02F 1/1368; G02F 1/134309; G02F 1/134336; G02F 2001/133742; G02F 2203/90; G09G 2300/0456
USPC .......................... 349/114, 139, 141, 147, 143
See application file for complete search history.

(56) References Cited

U.S. PATENT DOCUMENTS

| | | | |
|---|---|---|---|
| 2006/0114381 A1* | 6/2006 | Yang | G02F 1/133555 349/114 |
| 2012/0257141 A1* | 10/2012 | Peng | G02F 1/133555 349/62 |

* cited by examiner

LIQUID CRYSTAL DISPLAY DEVICE AND LIQUID CRYSTAL DISPLAY PANEL THEREOF

FIELD OF THE INVENTION

The present invention relates to a display technology field, and more particularly to a transflective liquid crystal display panel and a liquid crystal display device having the liquid crystal display panel.

BACKGROUND OF THE INVENTION

The liquid crystal display panel needs a light source for showing images because the liquid crystal molecules do not illuminate themselves. According to the types of the light sources, the panels can be categorized as transmissive type, reflective type and transflective type. The transmissive type liquid crystal display panel uses a back light as the light source. The pixel electrode is transparent electrode as being a transmitting region, which makes for the light of the back light source to penetrate the liquid crystal layer for showing images; the reflective type liquid crystal display panel uses a front light or the ambient light as the light source and comprises a reflective layer with excellent reflective property as being a reflecting region which is adaptable to reflect light of the front light source or the ambient light; the transflective type liquid crystal display panel is a combination of the transmissive type and the reflective type, which reflecting regions and transmitting regions are arranged. It can utilize the back light source, the front light source and the ambient light source for display at the same time.

The transflective type liquid crystal display panel unites the advantages of the transmissive type liquid crystal display panel and the reflective type liquid crystal display panel. It can show bright images in a dark environment for usage indoor and be good for usage outdoor. However, the transflective type liquid crystal display panel according to prior arts requires a larger drive voltage and larger power consumption for realizing the transflective display effect.

SUMMARY OF THE INVENTION

On this account, the technical issue to be solved by the embodiment of the present invention is to provide a liquid crystal display device and a liquid crystal display panel thereof, employing a new structure to achieve the transflective display effect and to reduce the drive voltage of the liquid crystal display panel.

For solving the aforesaid technical issue, the technical solution employed by the present invention is: to provide a liquid crystal display panel, and the liquid crystal display panel comprises a plurality of pixel units, a first substrate and a second substrate, which are oppositely spaced and located, and a liquid crystal layer sandwiched in between, wherein: each pixel unit comprises staggered reflecting regions and transmitting regions, and a thin film transistor; a side of the first substrate adjacent to the liquid crystal layer comprises a pixel electrode and a reflective layer, and the pixel electrode corresponds to the transmitting region, and the reflective layer corresponds to the reflecting region; a side of the second substrate adjacent to the liquid crystal layer comprises a common electrode, and the common electrode corresponds to the reflecting region and the transmitting region, and the common electrode is an electrode layer located on the entire second substrate; wherein the first substrate is an array substrate and the second substrate is a color filter for applying voltages to the pixel electrode corresponding to the transmitting region and the common electrode to achieve transflective display of the liquid crystal display panel, and the thin film transistor is coupled to the pixel electrode and employed for applying a drive voltage to the pixel electrode, and the liquid crystal layer is a negative liquid crystal layer, and the liquid crystal layer is vertically orientated when no voltage is applied.

A width of the reflecting region and a width of the transmitting region are not the same and cell thicknesses of the reflecting region and the transmitting region are the same.

A width of the pixel electrode and a width of the reflective layer are the same.

The reflective layer is an opaque metal layer.

For solving the aforesaid technical issue, another technical solution employed by the present invention is: to provide liquid crystal display panel, and the liquid crystal display panel comprises a plurality of pixel units, a first substrate and a second substrate, which are oppositely spaced and located, and a liquid crystal layer sandwiched in between, wherein: each pixel unit comprises staggered reflecting regions and transmitting regions; a side of the first substrate adjacent to the liquid crystal layer comprises a pixel electrode and a reflective layer, and the pixel electrode corresponds to the transmitting region, and the reflective layer corresponds to the reflecting region; a side of the second substrate adjacent to the liquid crystal layer comprises a common electrode, and the common electrode corresponds to the reflecting region and the transmitting region; wherein voltages are applied to the pixel electrode corresponding to the transmitting region and the common electrode to achieve transflective display of the liquid crystal display panel.

The liquid crystal layer is a negative liquid crystal layer, and the liquid crystal layer is vertically orientated when no voltage is applied.

Each pixel unit further comprises a thin film transistor coupled to the pixel electrode and employed for applying a drive voltage to the pixel electrode.

A width of the reflecting region and a width of the transmitting region are not the same and cell thicknesses of the reflecting region and the transmitting region are the same.

A width of the pixel electrode and a width of the reflective layer are the same.

The common electrode is an electrode layer located on the entire second substrate.

The reflective layer is an opaque metal layer.

The first substrate is an array substrate and the second substrate is a color filter.

For solving the aforesaid technical issue, another technical solution employed by the present invention is: to provide a liquid crystal display device comprising the aforesaid liquid crystal display panel.

A first polarizer is located at a side of the first substrate away from the liquid crystal layer, and a second polarizer is located at a side of the second substrate away from the liquid crystal layer, and both the first polarizer and the second polarizer are located in correspondence to the reflecting region and the transmitting region.

The liquid crystal layer is a negative liquid crystal layer, and the liquid crystal layer is vertically orientated when no voltage is applied.

Each pixel unit further comprises a thin film transistor coupled to the pixel electrode and employed for applying a drive voltage to the pixel electrode.

A width of the reflecting region and a width of the transmitting region are not the same and cell thicknesses of the reflecting region and the transmitting region are the same.

A width of the pixel electrode and a width of the reflective layer are the same.

The common electrode is an electrode layer located on the entire second substrate.

The reflective layer is an opaque metal layer.

With the aforementioned technical solutions, the benefits of the present invention are: according to the embodiment of the present invention, each pixel unit comprises staggered reflecting regions and transmitting regions. The reflecting region is corresponded with a reflective layer and a common electrode. The transmitting region is corresponded with a pixel electrode and a common electrode. By applying voltages to the pixel electrode and the common electrode but without applying voltages to the reflective layer of the reflecting region, the transflective display of the liquid crystal display panel can be achieved to enormously reduce the drive voltage required for the liquid crystal display panel.

DETAILED DESCRIPTION OF PREFERRED EMBODIMENTS

Hereinafter, the present invention in conjunction with the accompanying drawings which illustrate, be clear that the technical solution of the embodiment of the present invention, a complete description, it is clear that the described embodiments are merely part of embodiments of the present invention, but not all embodiments cases. Based on the embodiments of the present invention, all the other embodiments of the skilled in the art without creative efforts made under the obtained are within the scope of protection of the present invention.

Figure 1:
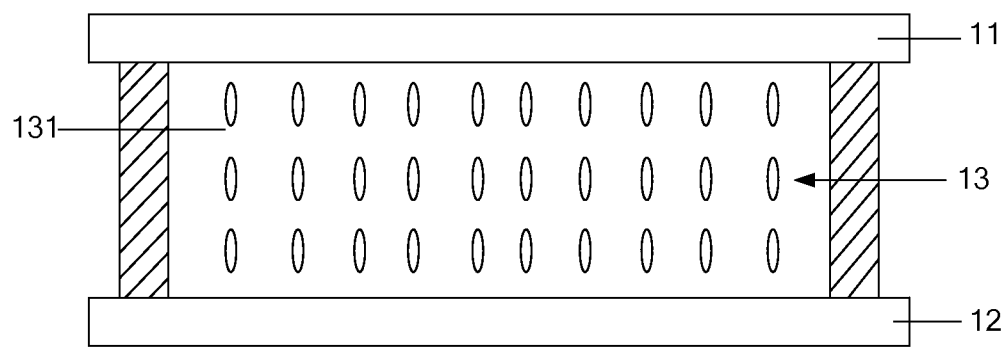
FIG. 1 is a sectional view structural diagram of a liquid crystal display panel according to a preferred embodiment of the present invention.

FIG. 1 is a sectional view structural diagram of a liquid crystal display panel according to a preferred embodiment of the present invention. As shown in FIG. 1, the liquid crystal display panel 10 of the embodiment comprises a first substrate 11, a second substrate 12, a liquid crystal layer 13 and a plurality of pixel units (not shown).

The first substrate 11 and the second substrate 12 are oppositely spaced and located, wherein the first substrate 11 is a TFT (Thin Film Transistor) array substrate. The first substrate 11 comprises a transparent substrate body, layout wirings of various kinds, pixel electrodes, et cetera. The second substrate 12 is a CF (color filter).

The liquid crystal layer 13 is filled and sandwiched between the first substrate 11 and the second substrate 12. The liquid crystal layer 13 comprises liquid crystal molecules 131 which the Dielectric Anisotropy is negative and a plurality of monomers mixed in the liquid crystal molecules 131. The liquid crystal molecules 131 are liquid crystal material that moving orientation at a particular direction will occur by applying voltages thereto. With the thresholds of the applied drive voltage, different moving orientations can be achieved and (the liquid crystal molecules 131) of the liquid crystal layer 13 are vertically orientated when no voltage is applied; the monomer is polymeric monomer, comprising acrylate resin monomer, methacrylate resin monomer, ethylene resin monomer, ethoxyethylene resin monomer, epoxy resin monomer and any combination thereof.

Figure 2:
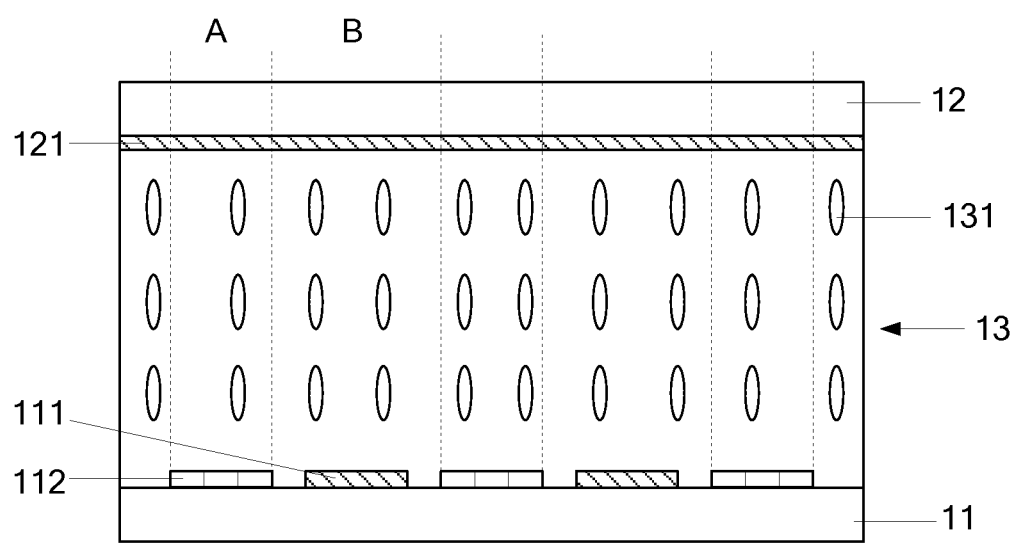
FIG. 2 is a sectional view structural diagram of a pixel unit when no voltage is applied according to the preferred embodiment of the present invention.

FIG. 2 is a sectional view structural diagram of a pixel unit when no voltage is applied according to the preferred embodiment of the present invention. Each pixel unit in the liquid crystal display panel 10 comprises a plurality of sub pixels and structures of the pixel units are similar. One pixel unit 20 is illustrated for the following description.

Please combine FIG. 1 and FIG. 2. The pixel unit 20 comprises a liquid crystal layer 13, in the corresponding space, and a pixel electrode 111 and a reflective layer 112 located at a side of the first substrate 11 adjacent to the liquid crystal layer 13 and a common electrode 121 located at a side of the second substrate 12 adjacent to the liquid crystal layer 13.

Preferably, the reflective layer 112 is an opaque metal layer or made by material of having excellent reflection. Preferably, the common electrode 121 and the pixel electrode 111 are transparent electrode layers. The material of the common electrode 121 and the pixel electrode 111 can be the same or different. For instance, the material can be Indium-Tin-Oxide (ITO), Indium-Zinc-Oxide (IZO), the other material possessing both transparency and electrical conductivity or any combination thereof. Preferably, a width of the pixel electrode 111 and a width of the reflective layer 112 are the same. The pixel electrode 111 and the reflective layer 112 are spaced located on the first substrate 11.

In this embodiment, the pixel unit 20 comprises staggered reflecting regions A and transmitting regions B. A width of the reflecting region A and a width of the transmitting region B are not the same and cell thicknesses of the reflecting region A and the transmitting region B are the same. The pixel electrode 111 corresponds to an area restricted in the transmitting region B. The reflective layer 112 corresponds to an area restricted in the reflecting region A. The common electrode 121 corresponds to the reflecting region A and the transmitting region B. Preferably, the common electrode 121 is an electrode layer located on the entire second substrate 12.

Figure 3:
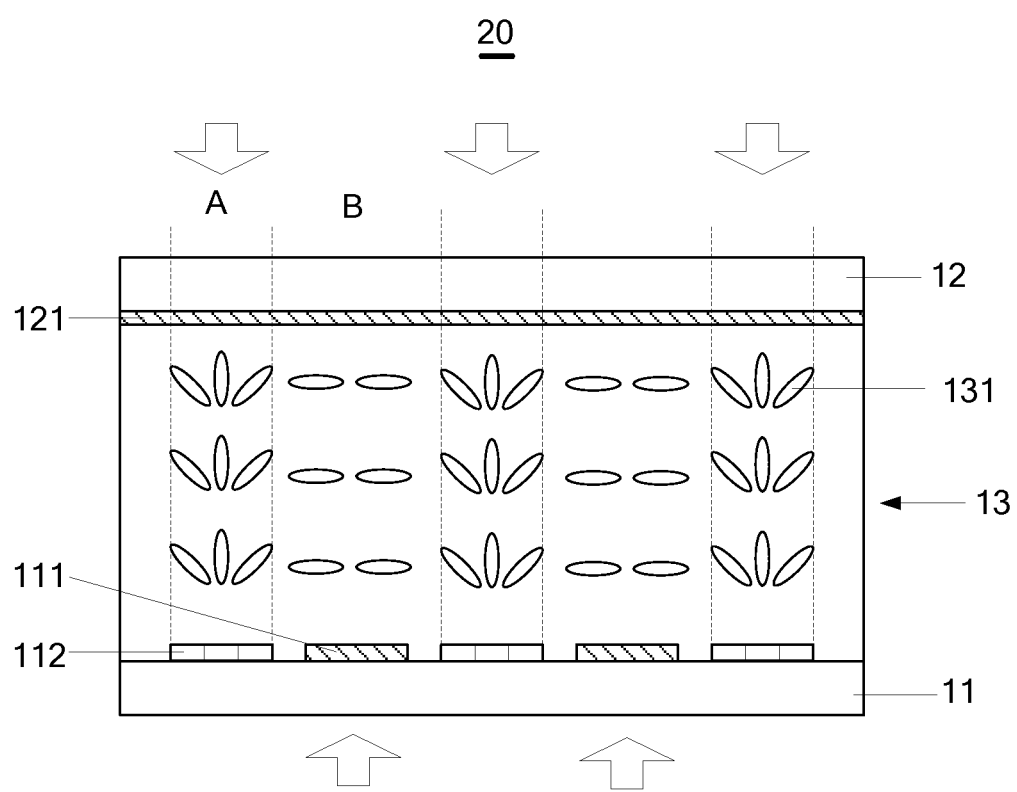
FIG. 3 is a sectional view structural diagram of a pixel unit when the voltage is applied according to the preferred embodiment of the present invention.

Further referring to FIG. 3 to be combined, it is not required to apply voltages to the reflective layer 112 of the reflecting region A when the voltage is applied to the pixel electrode 111 and the common electrode 121. Data lines and scan lines crisscrossing to one another are formed on the first substrate 11. The pixel electrode 111 of the pixel unit 20 is located in an area restricted by the data lines and scan lines. The pixel unit 20 applies a drive voltage to the pixel electrode 111 through the thin film transistor coupled to the pixel electrode 111. The pixel electrode 111 and the common electrode 121 are applied with the same voltage.

When the voltage is applied, the negative liquid crystal molecules 131 corresponding to the transmitting region B (the corresponding space between the pixel electrode 111 and the common electrode 121) are influenced by the vertical electric field and gradually moved to be horizontally aligned to generate a larger horizontal phase delay; a tilting electric field is formed between the pixel electrode 111 of the adjacent transmitting region B and the common electrode 121 corresponding to the reflecting region A because the pixel electrode 111 is not located in the reflecting region A.

The electric field appears to be tilting. Therefore, the negative liquid crystal molecules 131 corresponding to the reflecting region A (the corresponding space between the reflective layer 112 and the common electrode 121) are gradually moved to be tilting aligned to generate a smaller horizontal phase delay.

In case, the larger horizontal phase delay generated by the negative liquid crystal molecules 131 in the transmitting region B is $\Delta n1$, and the smaller horizontal phase delay generated by the negative liquid crystal molecules 131 in the reflecting region A is $\Delta n2$. With optimization for the electrode space between the adjacent pixel electrodes 111 and the width of the pixel electrodes 111 of the transmitting region B, a larger horizontal phase delay can be generated for the light passing through the transmitting region B than the light passing through the reflecting region A, such as $\Delta n1 = 2*\Delta n2$. The light passing through the reflecting region A travels twice through the liquid crystal layer 13 due to the reflection of the reflective layer 112, i.e. $d2=2*d1$. The d1 represents the distance that the light passes through the transmitting region B. The d2 represents the distance that the light passes through reflecting region A.

In conclusion, the amount of the phase delay of the light for passing through the transmitting region B is equal to the amount of the phase delay for passing through the reflecting region A, i.e. $n1*d1=\Delta n2*d2$ to realize the match for the phase delays of the transmitting region B and the reflecting region A. Ultimately, the transflective display effect can be achieved.

As aforementioned, the embodiment utilizes the aforesaid electrode structure of the reflecting region A and the transmitting region B. An even vertical electric field is employed when the voltage is applied to ensure that respective electric field lines are aligned in parallel and thereby to reduce the drive voltage required for the liquid crystal display panel 10 for raising the luminous transmittance and enlarging the view angle; meanwhile, by applying voltages to the pixel electrode 111 and the common electrode 121 but without applying voltages to the reflective layer 112 of the reflecting region A, the transflective display of the liquid crystal display panel can be achieved; besides, because the negative liquid crystal layer 13 is employed and vertically oriented when no voltage is applied, the dark-state light leakage can be diminished to promote the display contrast; moreover, the difficulty of the manufacture process can be reduced with the single cell thickness structure for the reflecting region A and transmitting region B.

The present invention further provides a liquid crystal display device, comprising the liquid crystal display panel 10 of the foregoing embodiment. The liquid crystal display device can be a smart phone, a tablet, a television, a navigator or any other terminals with display function.

Preferably, a first polarizer is located at a side of the first substrate 11 away from the liquid crystal layer 13. A second polarizer is located at a side of the second substrate 12 away from the liquid crystal layer 13. Both the first polarizer and the second polarizer are located in correspondence to the reflecting region A and the transmitting region B.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A liquid crystal display panel, comprising a plurality of pixel units, a first substrate and a second substrate, which are oppositely spaced and located, and a liquid crystal layer sandwiched in between, wherein:

each pixel unit comprises staggered reflecting regions and transmitting regions, and a thin film transistor;

a side of the first substrate adjacent to the liquid crystal layer comprises a pixel electrode and a reflective layer, and the pixel electrode corresponds to the transmitting region, and the reflective layer corresponds to the reflecting region; wherein the pixel electrode and the reflective layer are arranged in a same plane on the side of the first substrate adjacent to the liquid crystal layer;

a side of the second substrate adjacent to the liquid crystal layer comprises a common electrode, and the common electrode corresponds to the reflecting region and the transmitting region, and the common electrode is an electrode layer located on the entire second substrate;

wherein the first substrate is an array substrate and the second substrate includes a color filter and the pixel unit only applies voltages to the pixel electrode corresponding to the transmitting region and to the common electrode without applying voltages to the reflective layer of the reflecting region having no electrode therein to achieve transflective display of the liquid crystal display panel, and the thin film transistor is coupled to the pixel electrode and employed for applying a drive voltage to the pixel electrode, and the liquid crystal layer is a negative liquid crystal layer, and both the liquid crystal layer in the transmitting region and the liquid crystal layer in the reflecting region are vertically orientated when no voltage is applied to diminish a dark-state light leakage to promote a display contrast.

2. The liquid crystal display panel according to claim 1, wherein a width of the reflecting region and a width of the transmitting region are not the same and cell thicknesses of the reflecting region and the transmitting region are the same.

3. The liquid crystal display panel according to claim 2, wherein a width of the pixel electrode and a width of the reflective layer are the same.

4. The liquid crystal display panel according to claim 1, wherein the reflective layer is an opaque metal layer.

5. A liquid crystal display panel, comprising a plurality of pixel units, a first substrate and a second substrate, which are oppositely spaced and located, and a liquid crystal layer sandwiched in between, wherein:

each pixel unit comprises staggered reflecting regions and transmitting regions;

a side of the first substrate adjacent to the liquid crystal layer comprises a pixel electrode and a reflective layer, and the pixel electrode corresponds to the transmitting region, and the reflective layer corresponds to the reflecting region; wherein the pixel electrode and the reflective layer are arranged in a same plane on the side of the first substrate adjacent to the liquid crystal layer;

a side of the second substrate adjacent to the liquid crystal layer comprises a common electrode, and the common electrode corresponds to the reflecting region and the transmitting region;

wherein the pixel unit only applies voltages to the pixel electrode corresponding to the transmitting region and to the common electrode without applying voltages to the reflective layer of the reflecting region having no electrode therein to achieve transflective display of the liquid crystal display panel, and both the liquid crystal layer in the transmitting region and the liquid crystal layer in the reflecting region are vertically orientated when no voltage is applied to diminish a dark-state light leakage to promote a display contrast.

6. The liquid crystal display panel according to claim 5, wherein the liquid crystal layer is a negative liquid crystal layer, and the liquid crystal layer is vertically orientated when no voltage is applied.

7. The liquid crystal display panel according to claim 5, wherein each pixel unit further comprises a thin film transistor coupled to the pixel electrode and employed for applying a drive voltage to the pixel electrode.

8. The liquid crystal display panel according to claim 5, wherein a width of the reflecting region and a width of the transmitting region are not the same and cell thicknesses of the reflecting region and the transmitting region are the same.

9. The liquid crystal display panel according to claim 8, wherein a width of the pixel electrode and a width of the reflective layer are the same.

10. The liquid crystal display panel according to claim 5, wherein the common electrode is an electrode layer located on the entire second substrate.

11. The liquid crystal display panel according to claim 5, wherein the reflective layer is an opaque metal layer.

12. The liquid crystal display panel according to claim 5, wherein the first substrate is an array substrate and the second substrate includes a color filter.

13. A liquid crystal display device, wherein the liquid crystal display device comprises a liquid crystal display panel, and the liquid crystal display panel comprises a plurality of pixel units, a first substrate and a second substrate, which are oppositely spaced and located, and a liquid crystal layer sandwiched in between, wherein:
    each pixel unit comprises staggered reflecting regions and transmitting regions;
    a side of the first substrate adjacent to the liquid crystal layer comprises a pixel electrode and a reflective layer, and the pixel electrode corresponds to the transmitting region, and the reflective layer corresponds to the reflecting region; wherein the pixel electrode and the reflective layer are arranged in a same plane on the side of the first substrate adjacent to the liquid crystal layer;
    a side of the second substrate adjacent to the liquid crystal layer comprises a common electrode, and the common electrode corresponds to the reflecting region and the transmitting region;
    wherein the pixel unit only applies voltages to the pixel electrode corresponding to the transmitting region and to the common electrode without applying voltages to the reflective layer of the reflecting region having no electrode therein to achieve transflective display of the liquid crystal display panel, and both the liquid crystal layer in the transmitting region and the liquid crystal layer in the reflecting region are vertically orientated when no voltage is applied to diminish a dark-state light leakage to promote a display contrast.

14. The liquid crystal display device according to claim 13, wherein a first polarizer is located at a side of the first substrate away from the liquid crystal layer, and a second polarizer is located at a side of the second substrate away from the liquid crystal layer, and both the first polarizer and the second polarizer are located in correspondence to the reflecting region and the transmitting region.

15. The liquid crystal display device according to claim 13, wherein the liquid crystal layer is a negative liquid crystal layer, and the liquid crystal layer is vertically orientated when no voltage is applied.

16. The liquid crystal display device according to claim 13, wherein each pixel unit further comprises a thin film transistor coupled to the pixel electrode and employed for applying a drive voltage to the pixel electrode.

17. The liquid crystal display device according to claim 13, wherein a width of the reflecting region and a width of the transmitting region are not the same and cell thicknesses of the reflecting region and the transmitting region are the same.

18. The liquid crystal display device according to claim 17, wherein a width of the pixel electrode and a width of the reflective layer are the same.

19. The liquid crystal display device according to claim 13, wherein the common electrode is an electrode layer located on the entire second substrate.

20. The liquid crystal display device according to claim 13, wherein the reflective layer is an opaque metal layer.

* * * * *